(12) United States Patent
Elliott

(10) Patent No.: US 6,980,659 B1
(45) Date of Patent: Dec. 27, 2005

(54) METHODS AND SYSTEMS FOR SUPPLYING ENCRYPTION KEYS

(76) Inventor: Brig Barnum Elliott, 25 Wollaston Ave., Arlington, MA (US) 02476

( * ) Notice: Subject to any disclaimer, the term of this patent is extended or adjusted under 35 U.S.C. 154(b) by 1035 days.

(21) Appl. No.: 09/585,933

(22) Filed: Jun. 2, 2000

(51) Int. Cl.[7] .............................. H04L 9/00; H04L 9/32
(52) U.S. Cl. ..................... 380/277; 713/189; 713/193
(58) Field of Search ............................... 380/228, 247, 380/255, 262, 270, 277–279, 44, 47, 283; 713/168–172, 713/192–194, 189

(56) References Cited

U.S. PATENT DOCUMENTS

| | | | |
|---|---|---|---|
| 4,897,875 A | 1/1990 | Pollard et al. ............... 380/21 |
| 5,126,959 A | 6/1992 | Kurihara ..................... 364/717 |
| 5,586,185 A | 12/1996 | Shibata et al. ............... 380/21 |
| 6,052,468 A | 4/2000 | Hillhouse | |
| 6,212,639 B1 | 4/2001 | Erickson et al. ............ 713/200 |
| 6,359,986 B1 * | 3/2002 | Tatebayashi ................ 380/277 |
| 6,560,581 B1 * | 5/2003 | Fox et al. .................... 705/51 |
| 6,708,273 B1 * | 3/2004 | Ober et al. .................. 713/189 |

OTHER PUBLICATIONS

Bruce Schneier, Applied Cryptography, Second Edition, Protocols, Algorithms and Source Code in C, John Wiley & Sons, Inc., 1996, pp. 176-181.

* cited by examiner

*Primary Examiner*—Hosuk Song
(74) *Attorney, Agent, or Firm*—Leonard C. Suchyta, Esq.; Joseph R. Palmleri, Esq.

(57) ABSTRACT

A system encrypts information. The system includes a key storage module (135) configured to store encryption bits in a memory of the key storage module. The system further includes a communication device (105) configured to retrieve a quantity of encryption bits from the memory of the key storage module. The retrieval depletes a total amount of encryption bits stored in the key storage module. The communication device is further configured to encrypt data transmitted from the communication device using the quantity of retrieved encryption bits.

17 Claims, 8 Drawing Sheets

METHODS AND SYSTEMS FOR SUPPLYING ENCRYPTION KEYS

FIELD OF THE INVENTION

The present invention relates generally to encryption devices and, more particularly, to a system and method for supplying encryption keys to encryption devices.

BACKGROUND OF THE INVENTION

Accompanying the phenomenal growth in consumer communications has been an ever-growing need for ensuring the privacy of consumer communications. This need has been satisfied to some extent for cellular telephones by using various encryption techniques. It is expected that the need will soon become apparent for data communications as well. As wireless communications become more prevalent, the need for ensuring the privacy of consumer communications will likely grow even further.

Conventional methods of ensuring consumer communication privacy typically use message encryption keys (i.e., session keys). Session keys generally are only used once to encrypt a given flow of messages. For instance, a cell phone conversation would likely use only a single session key. Once a call is finished, the session key would be discarded. A subsequent call would require a new session key.

Session keys can be created "on the fly" by algorithmic techniques or they can be created "in the factory" and used as needed. Conventionally, consumer communications devices create session keys "on the fly" by algorithmic techniques. This approach has two major drawbacks, however. First, it is difficult to guarantee truly random session keys because the algorithms have only a limited set of possible inputs and, therefore, will generate only a limited set of pseudo-random outputs. Second, generating good session keys is computationally expensive and, thus, requires a powerful processing unit and an ample supply of power. Both of these requirements are problematic for hand-held wireless devices.

Therefore, there exists a need for a system and method that can generate encryption keys and supply the generated encryption keys to consumer communications devices with low power requirements and without requiring a powerful processor in the communication device.

SUMMARY OF THE INVENTION

Systems and methods consistent with the present invention address this need by providing low power plug-in key storage modules that can supply encryption key bits to cellular telephones, computers, or other communications devices. Each plug-in key storage module stores a limited supply of encryption session keys that can be used for encrypting communications. Each plug-in key storage module can store encryption session keys of any desired length, thus, allowing different communication sessions to use different sized encryption session keys.

In accordance with the purpose of the invention as embodied and broadly described herein, a method of encrypting information includes generating a first collection and a second collection of encryption bits in a key supply device, supplying the first collection of encryption bits to a key storage module, storing the first collection of encryption bits in a memory of the key storage module, transporting the key storage module to a data production device, connecting the key storage module to the data production device, supplying the first collection of encryption bits from the module to the data production device, deleting the first collection of encryption bits from the memory of the key storage module, and encrypting data produced by the data production device using the first collection of encryption bits.

In another implementation consistent with the present invention, a method of encrypting information includes retrieving a quantity of encryption bits from a memory of a key storage module connected to a port of a communication device. The retrieval depletes a total amount of encryption bits stored in the key storage module. The method further includes encrypting data transmitted from the communication device using the quantity of encryption bits.

In a further implementation consistent with the present invention, a system for encrypting information includes a key storage module configured to store encryption bits in a memory of the key storage module. The system further includes a communication device configured to retrieve a quantity of encryption bits from the memory of the key storage module. The retrieval depletes a total amount of encryption bits stored in the key storage module. The communication device is further configured to encrypt data transmitted from the communication device using the quantity of encryption bits.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide plug-in key storage modules that can supply encryption key bits to communications devices. Each plug-in key storage module stores a limited supply of encryption session keys that can be used for encrypting communications in the communications devices. Each plug-in key storage module can store encryption session keys of any desired length, thus, allowing different communication sessions to use different sized encryption session keys.

Exemplary Network

Figure 1:
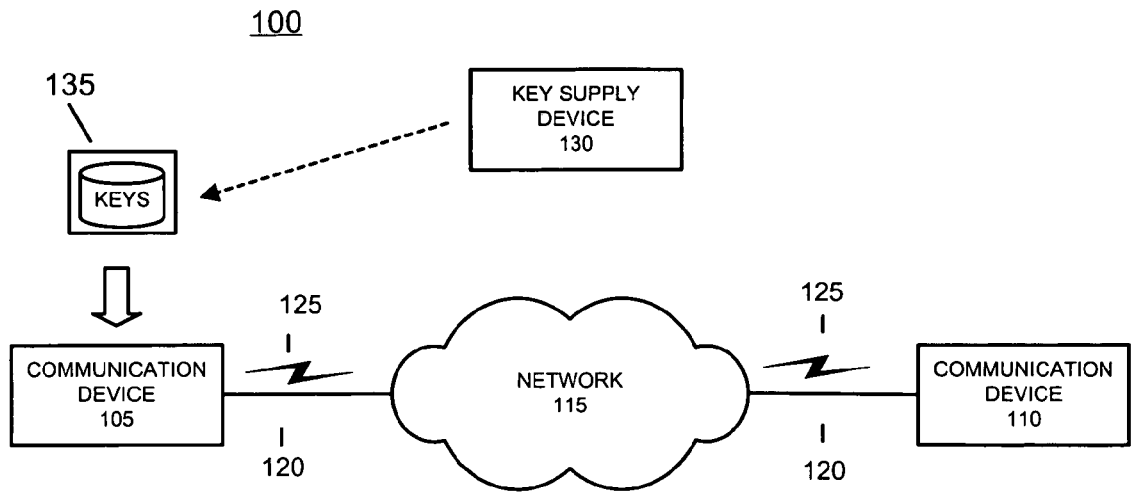
FIG. 1 illustrates an exemplary network in which a system and method, consistent with the present invention, may be implemented.

FIG. 1 illustrates an exemplary network 100 in which a system and method, consistent with the present invention, may operate to deliver supplies of encryption session keys to communication devices communicating within network 100. Network 100 includes communication device 105 connected with communication device 110 via network 115, using wired (120), wireless (125) or optical connection links (not shown). Network 100 further includes key supply device (KSD) 130 and key container(s) 135.

Network 115 can include one or more networks of any type, including a local area network (LAN), metropolitan area network (MAN), wide area network (WAN), Internet, Intranet, or Public Switched Telephone Network (PSTN).

Communication devices 105 and 110 may be similarly constructed and may include personal computers, personal digital assistants (PDAs), telephones, cellular telephones, computer game machines (e.g., Gameboy), small network-resident devices (e.g., thermostats, sensors, actuators, or other network appliances) or similar communications devices.

Key supply device 130 can include a computer or Application Specific Integrated Circuit (ASIC) that generates encryption session keys and stores then in a database. Key container 135 can be electrically interfaced with key supply device 130 to receive a new supply of encryption session keys.

Key container(s) 135 includes electrical devices that store encryption session keys received from key supply device 130. Key container(s) 135 includes some form of non-volatile memory and circuitry sufficient to retrieve session keys from the memory and supply the session keys to communication device 105. The packaging of Key container(s) 135 can include the logical and physical interfaces defined for PCMCIA cards, compact flash cards (such as those used in digital cameras), Subscriber Identity Modules for Global System for Mobile communications (GSM) cell phones or cable set-top devices, serial ports or the like.

Exemplary Communication Device

Figure 2:
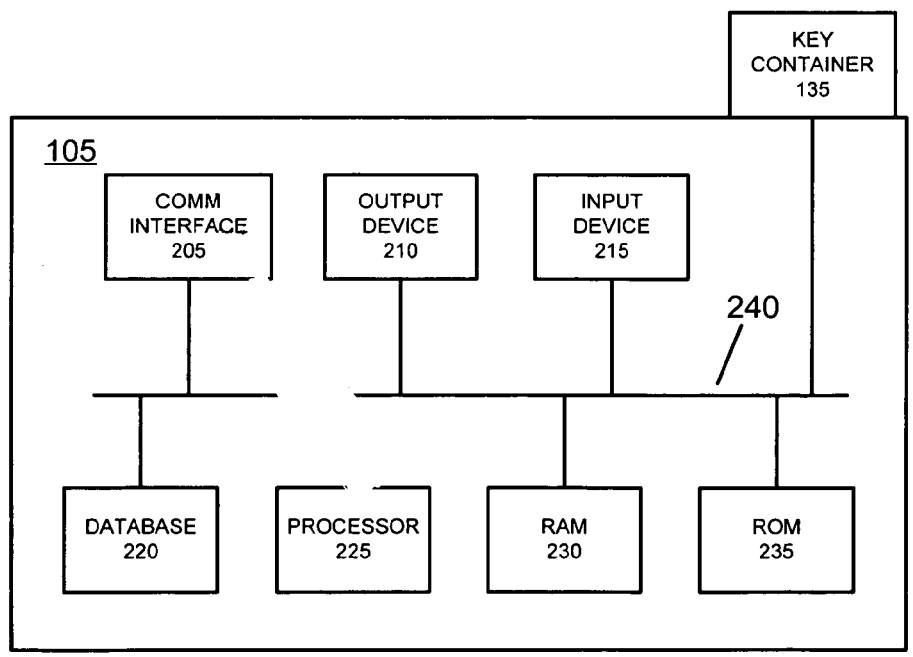
FIG. 2 illustrates exemplary components of a communication device consistent with the present invention.

FIG. 2 illustrates an exemplary communication device 105, consistent with the present invention, that may use session key bits from key container 135 for encrypting data. Communication device 105 may include a communication interface 205, an output device 210, an input device 215, a database 220, a processor 225, a Random Access Memory (RAM) 230, a Read Only Memory (ROM) 235 and a bus 240. Communication device 105 may additionally include a key container electrically interfaced with bus 240.

Communication interface 205 connects communication device 105 to another device or network, such as network 115. Communication interface 205 may include transceiver circuitry well known to one skilled in the art that can be tuned to multiple channels for transmitting data in a network, such as network 115. Output device 210 permits the output of data in video, audio, or hard copy format. Input device 215 permits entry of data into communication device 105 and may include a user interface (not shown).

Database 220 maintains encryption session keys and may include a large-capacity storage device, such as a magnetic or optical recording medium and its corresponding drive. Processor 225 performs all data processing functions for inputting, outputting, and processing of communication device 105 data. Random Access Memory (RAM) 230 provides temporary working storage of data and instructions for use by processor 225. Read Only Memory (ROM) 235 provides permanent or semi-permanent storage of data and instructions for use by processor 225. Bus 240 interconnects the various components of communication device 105 and allows the components to communicate with one another.

Figure 3:
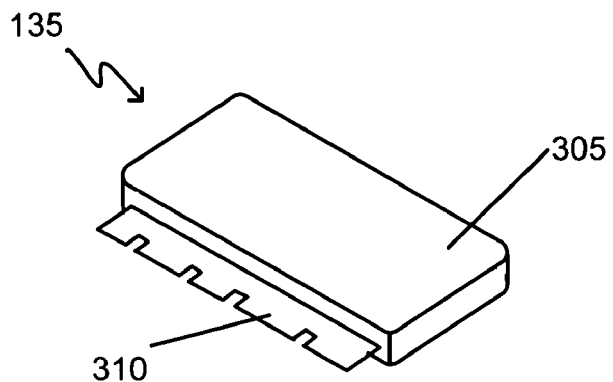
FIG. 3 illustrates an exemplary key container housing consistent with the present invention.

FIG. 3 illustrates exemplary physical packaging for key container 135. Key container 135 may include a housing 305 that houses the electrical circuitry of the key container. Key container 135 may also include an electrical interface 310 for plugging into a port of communication device 105.

Figure 4:
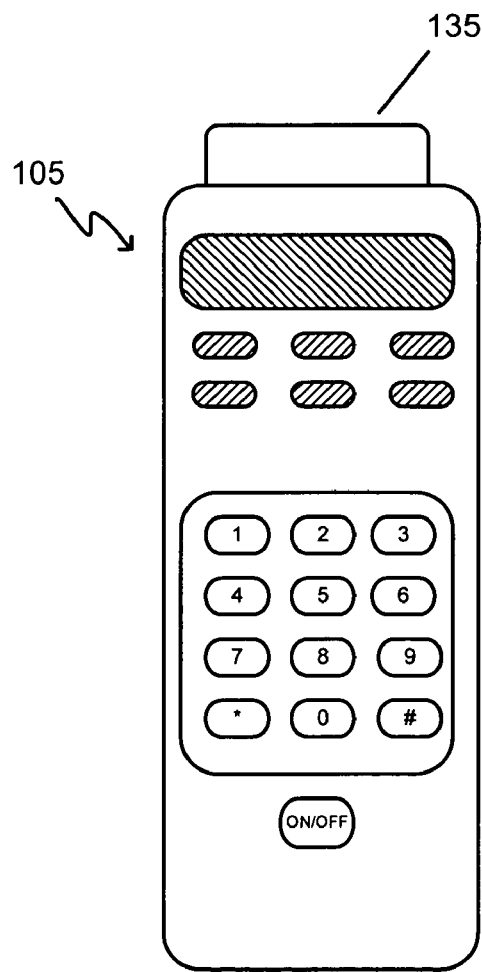
FIG. 4 illustrates a handset of an exemplary communication device consistent with the present invention.

FIG. 4 illustrates an example of an exemplary key container 135 plugged into an interface port of an exemplary communication device 105 (e.g., a cellular phone).

Exemplary Key Container

Figure 5:
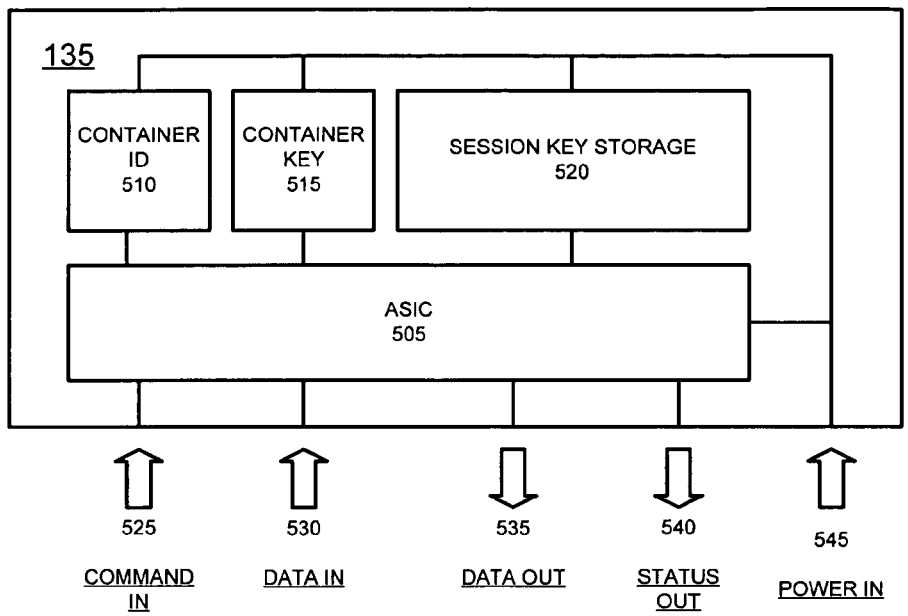
FIG. 5 illustrates exemplary components of a key container consistent with the present invention.

FIG. 5 illustrates an exemplary key container 135 consistent with the present invention. Key container 135 can include an Application Specific Integrated Circuit (ASIC) 505, a container identifier storage 510, a container key storage 515, and a session key storage 520. Key container 135 may further include input electrical interfaces and output electrical interfaces. These interfaces can include logically distinct channels for receiving data from key supply device 130 or supplying data to communication device 105. The interfaces may be implemented using different physical connectors or through multiplexing across a small number of connectors. The interfaces may be serial or parallel. In the case of serial interfaces, the format of the messages can be designed so that the messages clearly indicate which messages contain commands, data or status information.

FIG. 5 illustrates exemplary input electrical interfaces COMMAND IN 525, DATA IN 530 and POWER IN 545, and exemplary output electrical interfaces DATA OUT 535 and STATUS OUT 540. Interfaces 525 through 540 connect to ASIC 505. POWER IN interface 545 additionally supplies power to ASIC 505, container identifier storage 510, container key storage 515 and session key storage 515.

ASIC 505 can include conventional low power logic circuitry (e.g., CMOS) for implementing the processing that stores and retrieves key container identifiers, container keys and session keys.

Container identifier storage 510 includes programmable or non-programmable memory and stores a unique identifier for key container 135. The unique identifier is typically assigned to key container 135 when session keys are stored in the key container 135 for the first time. The unique container identifier may, for example, be approximately 8 bytes in length, though any length identifier may be used.

Container key storage 515 includes programmable or non-programmable memory and may store a unique secret key for key container 135. This secret key may be assigned to key container 135 when session keys are first supplied to the container from key supply device 130. The unique secret key can be used by key supply device 130 to "unlock" key container 135 so that session key information may be stored in session key storage 520. The unique secret key may, for example, be a random number that is approximately 20 bytes in length.

Session key storage 520 includes a non-volatile, re-programmable memory that stores unused session keys for key container 135. The stored session keys can be encryption key bits generated using conventional techniques or randomized bits that can be used as "seeds" for generating cryptographically secure pseudo-random sequences in accordance with conventional techniques. Session key storage 520 may include flash memory, battery-backed RAM, static RAM, magnetic memory, or the like. The session key bits stored in session key storage 520 can be supplied by key supply device 130. Session key storage 520 may also store certain values needed by ASIC 505, such as a pointer in the memory to indicate the next unused byte of session key bits.

COMMAND IN interface 525 accepts commands from communication device 105 or key supply device 130. DATA IN interface 530 accepts data from key supply device 130. Such data can include container identifiers, container keys, and session key bits. POWER IN interface 545 accepts power supplied by key supply device 130 or communication device 105 for energizing key container 135. DATA OUT interface 535 outputs container identifiers or session keys bits according to instructions from ASIC 505. STATUS OUT interface 540 outputs status information, such as information indicating how many unused session key bits are still stored in session key storage 520. For example, the status information may indicate a quantitative value, such as the number of bits or bytes remaining in session key storage 520. As a further example, such information may indicate that session key storage 520 is "running low" on session key bits.

Exemplary Key Supply Device

Figure 6:
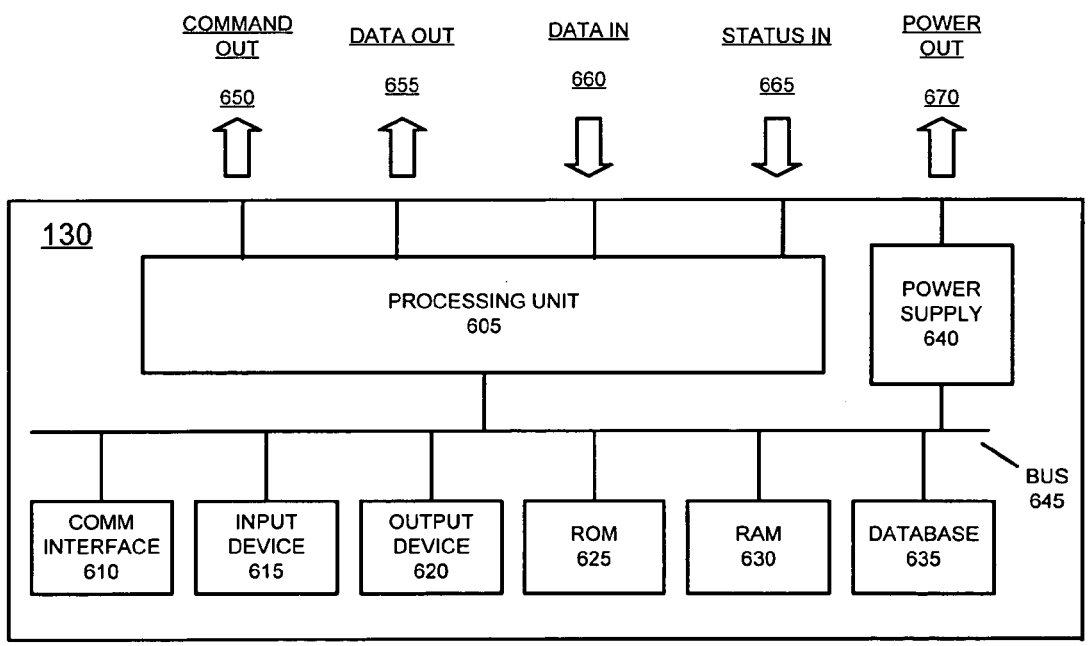
FIG. 6 illustrates exemplary components of a key supply device consistent with the present invention.

FIG. 6 illustrates an exemplary key supply device 130 consistent with the present invention. Key supply device 130 can include a processing unit 605, a communication interface 610, an input device 615, an output device 620, a ROM 625, a RAM 630, a database 635, a power supply 640 and a bus 645. Key supply device 130 further includes input electrical interfaces DATA IN 660 and STATUS IN 665 and output electrical interfaces COMMAND OUT 650, DATA OUT 655 and POWER OUT 670. Interfaces 650 through 670 connect to processing unit 605.

Processing unit 605 can include conventional logic circuitry for implementing the processing that retrieves and supplies key container identifiers, container keys and session keys to communication device 105. Alternatively, processing unit 605 can include a conventional microprocessor or micro-controller.

Communication interface 610 may connect key supply device 130 to another device or network, such as network 115. Input device 615 permits entry of data into key supply device 130 and may include a user interface (not shown). Output device 620 permits the output of key supply device 130 data in video, audio, or hard copy format.

ROM 625 may provide permanent or semi-permanent storage of data and instructions for use by processing unit 605. RAM 630 provides temporary working storage of key supply device data and instructions for use by processing unit 605. Database 635 maintains session keys bits and may include a large-capacity storage device, such as a magnetic or optical recording medium and its corresponding drive. Power supply 640 includes conventional circuitry for supplying power to key container 135 via POWER OUT interface 670. Bus 645 interconnects the various components of key supply device 130 and allows the components to communicate with one another.

Key supply device 130 further includes input electrical interfaces and output electrical interfaces. These interfaces can include logically distinct channels for supplying/retrieving data to/from key container 135. The interfaces may be implemented using different physical connectors or through multiplexing across a small number of connectors. The interfaces may be serial or parallel. In the case of serial interfaces, the format of the messages can be designed so that the messages clearly indicate which messages contain commands, data or status information. Exemplary output electrical interfaces of key supply device 130 include COMMAND OUT 650, DATA OUT 655 and POWER OUT 670. Exemplary input electrical interfaces of key supply device 130 include DATA IN 660 and STATUS IN 665. Interfaces 650 through 670 connect to processing unit 605.

COMMAND OUT interface 650 supplies commands to key container 135. DATA OUT interface 655 supplies data to key container 135. Such data can include container identifiers, container keys, and session key bits. POWER OUT interface 670 supplies power to key container 135. DATA IN interface 660 receives data from key container 135. STATUS IN interface 665 receives status information such as, for example, data indicating how many unused session key bits are still stored in session key storage 520 of key container 135.

Exemplary Key Supply Processing

Figure 7:
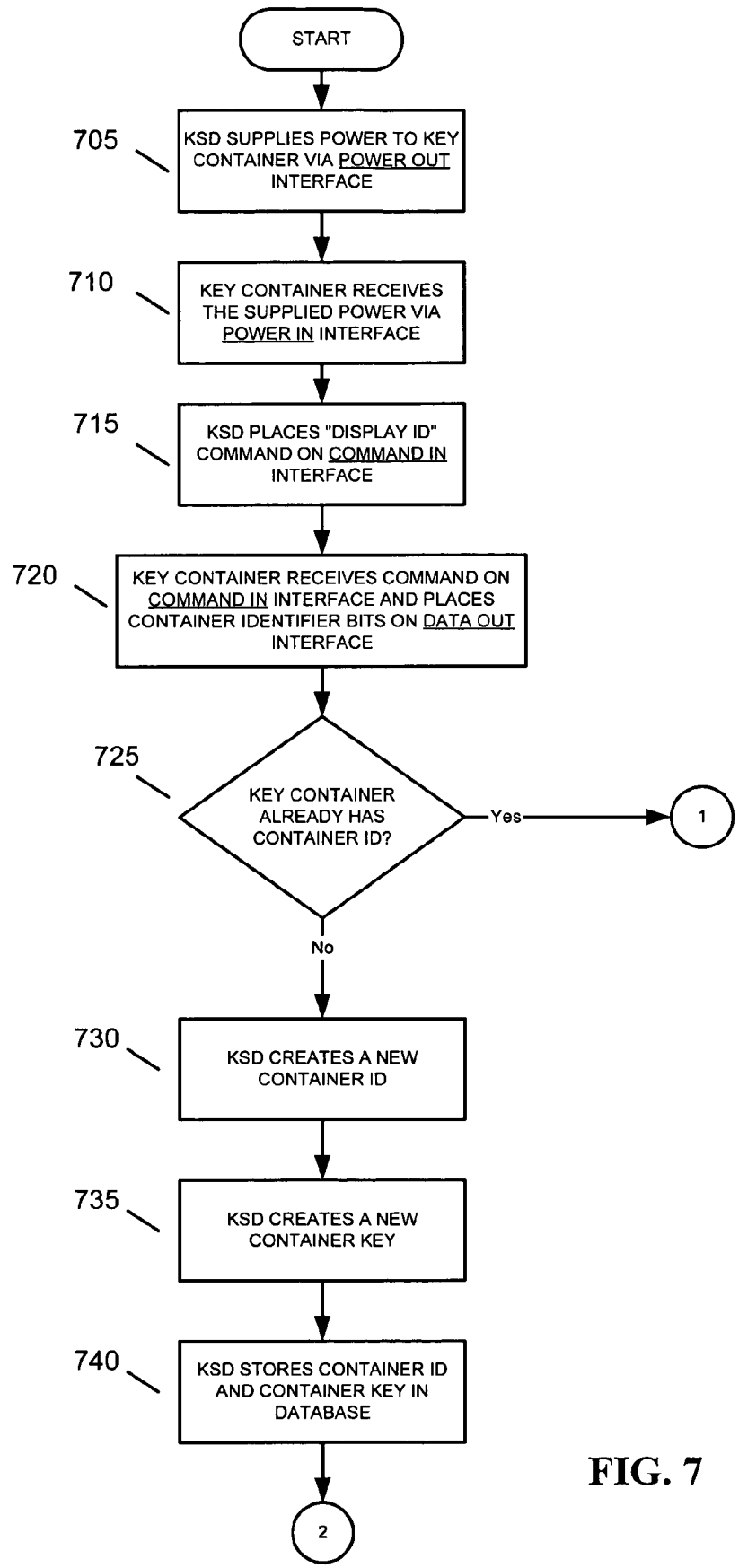
FIGS. 7–11 are flow diagrams of exemplary system processing consistent with the present invention.
Figure 8:
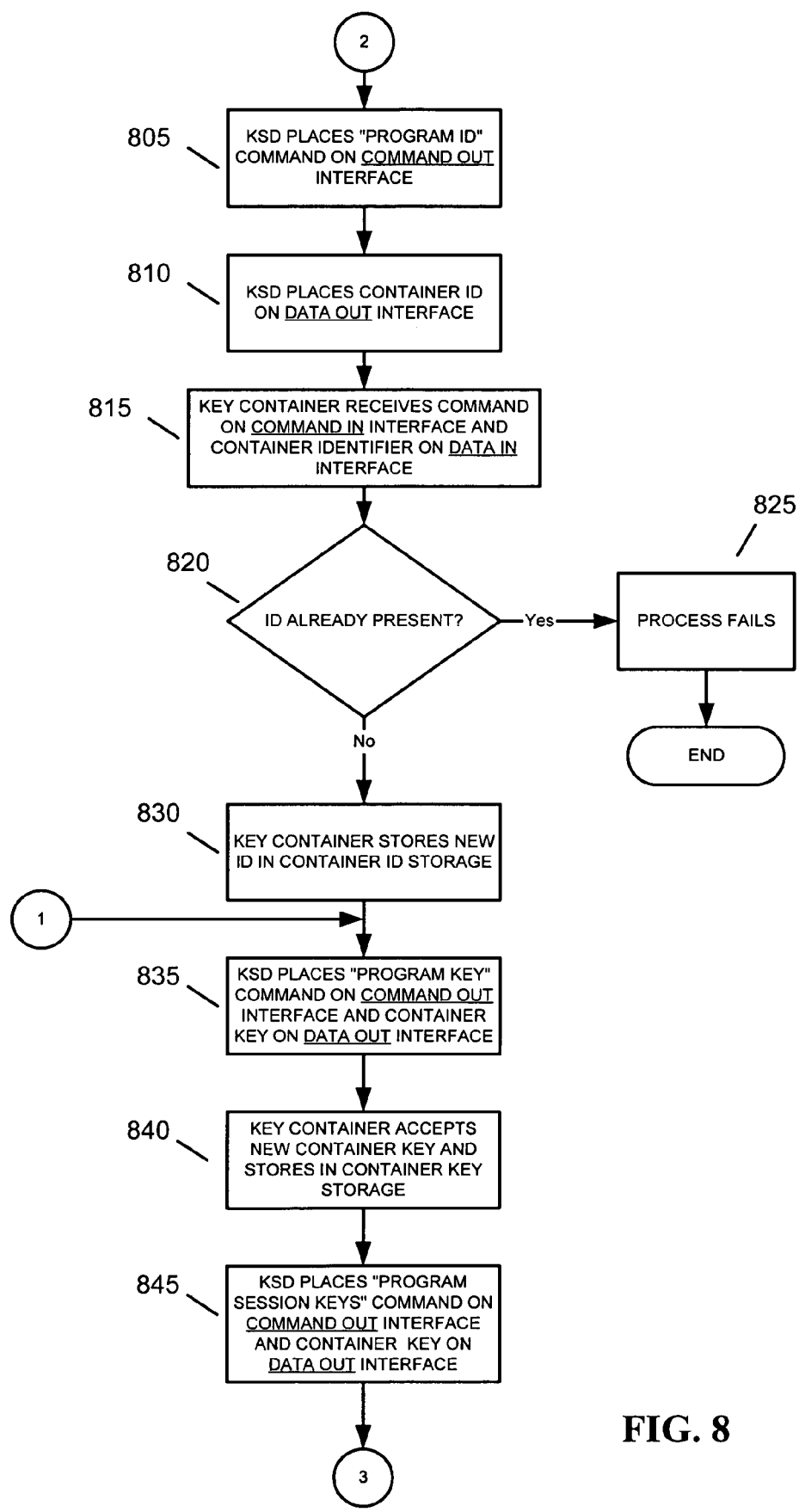
Figure 9:
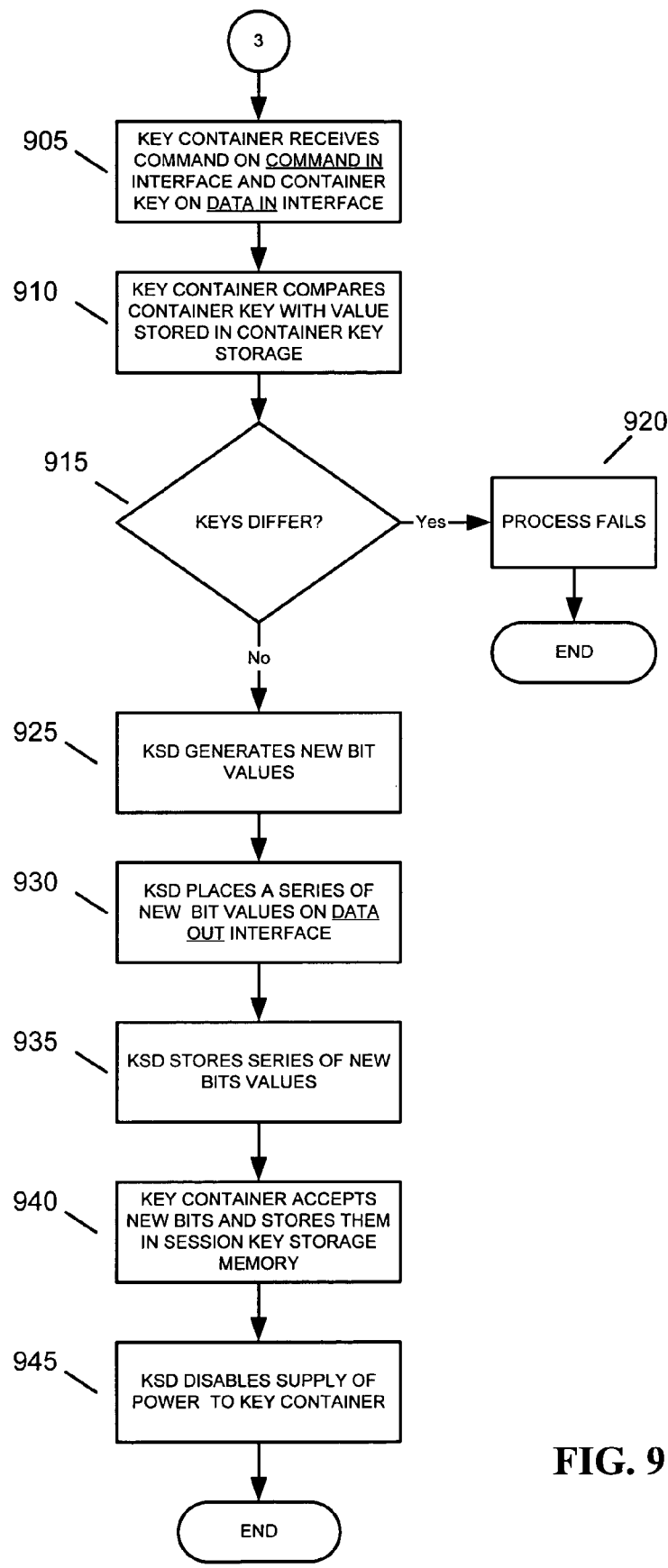

FIGS. 7–9 are flowcharts that illustrate exemplary processing, consistent with the present invention, for supplying encryption keys to key container 135. To supply session keys to key container 135, key container 135 may first be plugged into an electrical interface of key supply device 130. After being electrically interfaced with key container 135, key supply device 130 supplies power to key container via POWER OUT interface 670 [step 705] (FIG. 7). Key container 135 receives the supplied power via POWER IN interface 545 [step 710]. Key supply device 130 then places a "display identifier" command on COMMAND OUT interface 650 [step 715]. Key container 135 receives the command at the COMMAND IN interface 525 and, in response, places container identifier bits stored in container ID storage 510 on DATA OUT interface 535 [step 720].

Key supply device 130 receives the container identifier bits on DATA IN 660 and checks to verify that the bits are valid identifier bits (i.e., key container 135 already has an assigned identifier) [step 725]. For example, all zeros may indicate that the key container 135 has not been assigned an identifier. If key container 135 already has an assigned identifier then processing continues at step 835 below. If the container identifier bits indicate that key container 135 has not been assigned a container identifier, then key supply device 130 creates a new container identifier [step 730]. Key supply device 130 further creates a new container key [step 730]. As discussed previously, this container key may be used by key supply device 130 to unlock key container 135 to store session key information in key container 135. Key supply device 130 stores the created container identifier and container key in database 635 [step 740].

Key supply device 130 next places a "program identifier" command on COMMAND OUT interface 650 [step 805] (FIG. 8). Key supply device 135 also places the newly created container identifier on DATA OUT interface 655 [step 810]. Key container 135 receives the command on COMMAND IN interface 525 and the newly created container identifier on DATA IN interface 530 [step 815]. Key container 135 checks the container ID storage 510 to verify that the key container does not have already have an assigned container identifier [step 820]. If key container 135 already has an assigned container identifier, the process fails at step 825. Key container 135 stores the new container identifier in container ID storage 510 if the key container 135 does not have an assigned container identifier [step 830].

Key supply device 135 next places a "program key" command on COMMAND OUT interface 650 and a container key on DATA OUT interface 655 [step 835]. Key container 135 receives the command on COMMAND IN interface 525 and the new container key on DATA IN interface 530 and stores the new container key in container key storage 515 [step 840].

Key supply device 135 then places a "program session keys" command on COMMAND OUT interface 650 and a container key corresponding to key container 135 on DATA OUT interface 655 [step 845]. Key container 135 receives the command on COMMAND IN interface 525 and the container key on DATA IN interface 530 [step 905] (FIG. 9). Key container 135 compares the received container key with the container key stored in container key storage 515 [step 910]. If the comparison indicates that the keys differ [step 915], then the process fails at step 920. If the keys are the same, key supply device 130 generates new session key bit values using one of any number of conventional key generation algorithms [step 925]. For example, a random physical process, such as thermal noise, can be used to generate new session key bit values.

Key supply device 130 retrieves generated session key bit values from database 635 and places the session key bit values on DATA OUT interface 655 [step 930]. Key supply device 130 further stores the session key bit values in database 635 [step 935]. Storing these bit values in database 635 enables key container 135 to perform auditing and other record keeping functions at a later time. Key container 135 receives the new session key bit values on DATA IN interface 530 and stores the keys in session key storage 520 [step 940]. Key supply processing completes with key supply device 130 disabling the supply of power to key container 135 [step 945]. In the manner described above, session keys are supplied to key container 135 in an efficient, secure manner for later use by a device, such as communication device 105, as described in more detail below.

Exemplary Key Extraction Processing

Figure 10:
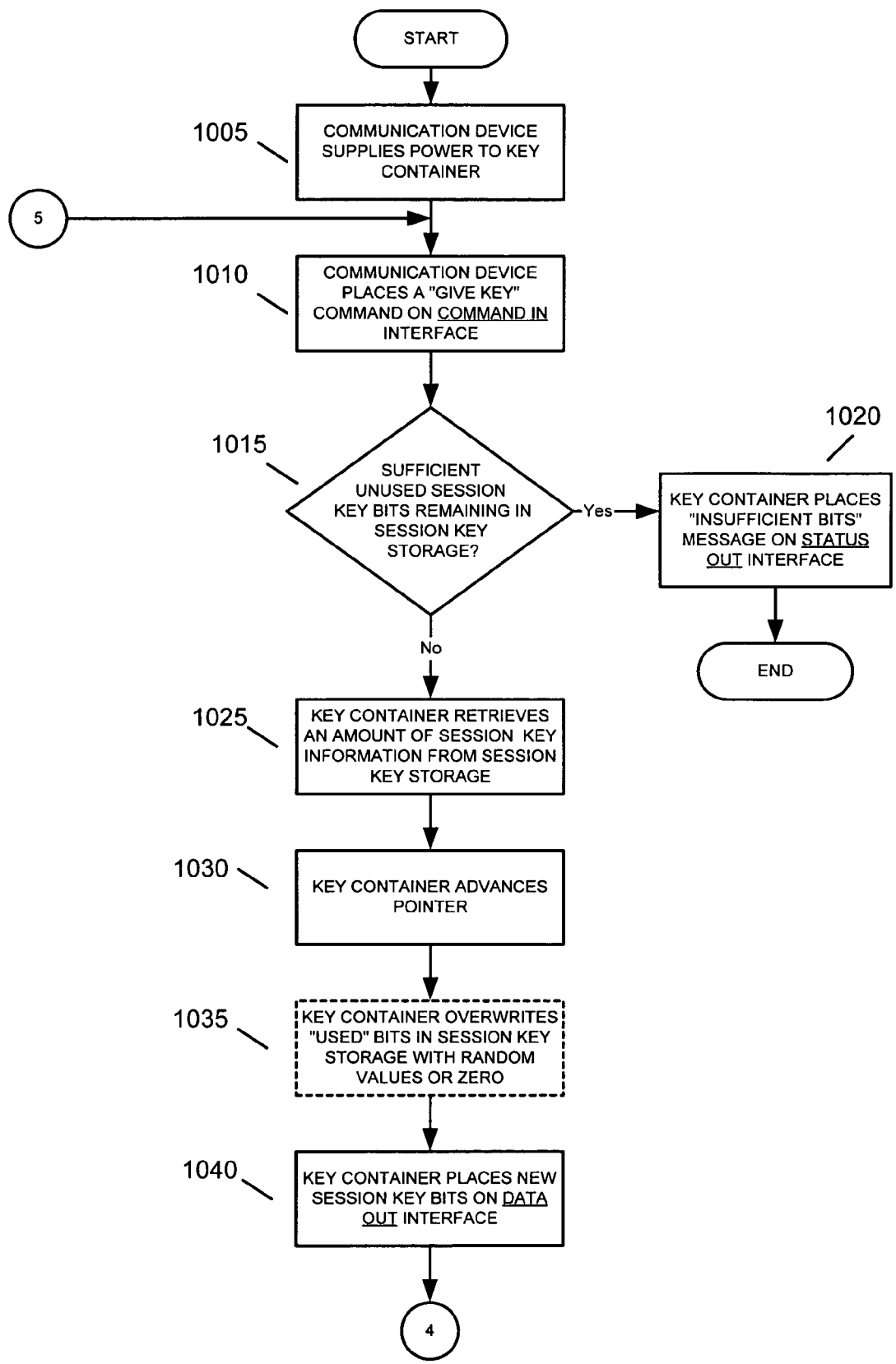
Figure 11:
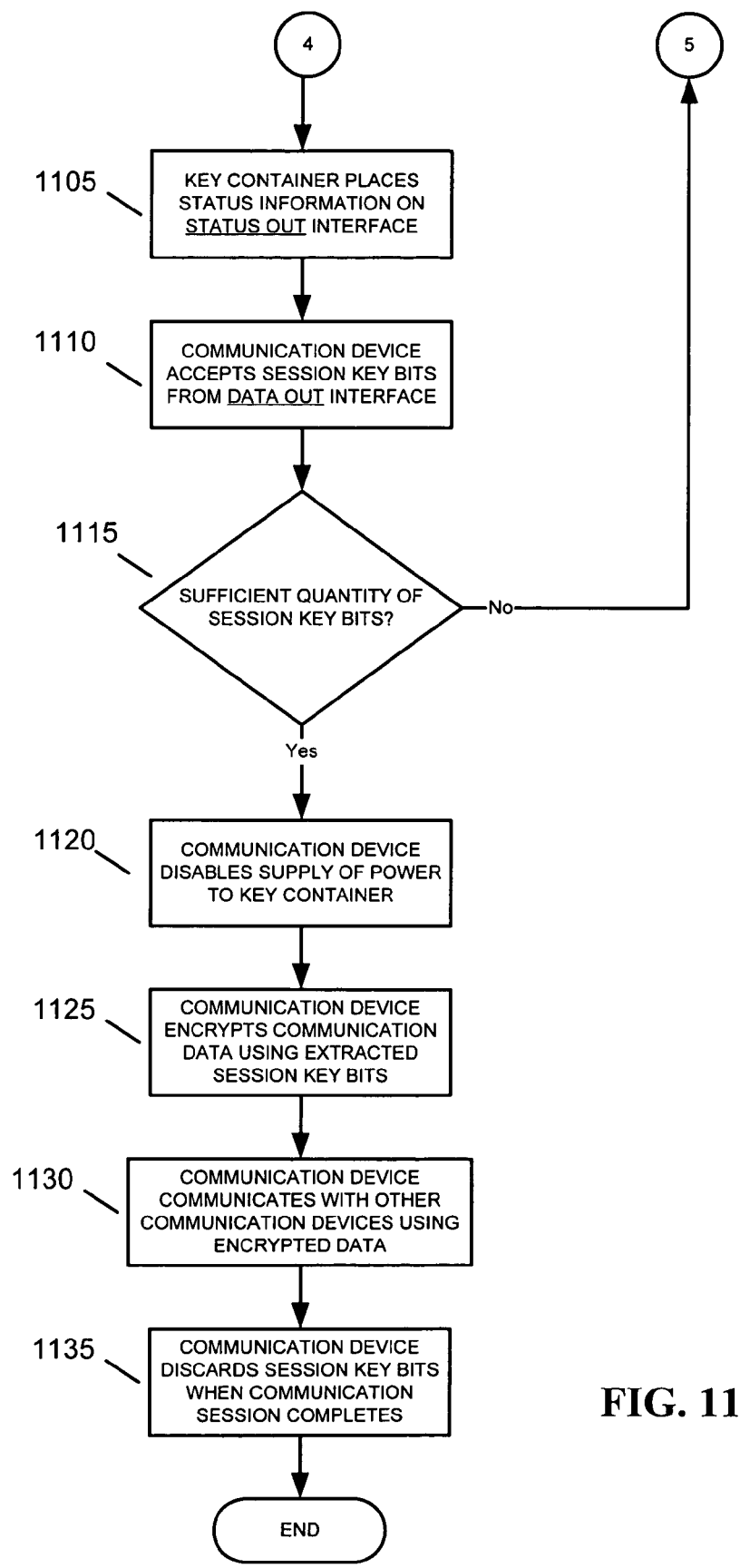

FIGS. 10–11 are flowcharts that illustrate exemplary processing, consistent with the present invention, for extracting keys from key container 135 for use in encrypting data produced in communication device 105. Key extraction processing begins with communication device 105 supplying power to key container 135 via POWER IN 545 [step 1005] (FIG. 10). Communication device 105 then places a "give key" command on COMMAND IN interface 525 of key container 135 [step 1010]. Key container 135 checks session key storage 520 to verify that sufficient unused session bits remain in storage [step 1015]. If there are not sufficient unused session key bits in session key storage 520, the key container 135 places an "insufficient bits" message on STATUS OUT interface 540 [step 1020]. If sufficient unused session keys bits remain in session key storage 520, key container 135 retrieves an amount of session key bits from session key storage 520 [step 1025]. The amount of session key bits retrieved from session key storage 520 can depend on parameters such as, for example, the desired level of encryption security or the length of the data message, and may be user-selectable. Key container 135 advances a session key storage pointer [step 1030]. Key container 135 may optionally delete "used" bits in session key storage 520 by, for example, overwriting "used" bits in session key storage 520 with random values or zeros [step 1035]. Key container 135 then places new session key bits on DATA OUT interface 535 [step 1040]. Key container 135 also may place status information on STATUS OUT interface 540 [step 1105] (FIG. 11). For example, key container 135 may output information relating to the number of unused session key bits remaining in session key storage 520.

Communication device 105 accepts the session key bits received from DATA OUT interface 535 of key container 135 [step 1110]. Communication device 105 then determines if the device 105 has received a sufficient quantity of bits from key container 135 for performing encryption [step 1115]. If not, processing returns to step 1010. If communication device 105 has a sufficient quantity of session key bits, key extraction processing completes with communication device 105 disabling the supply of power to key container 135 [step 1120].

After communication device 105 extracts the session key bits, communication device 105 can communicate in a secure manner with another communication device, such as communication device 110. Communication device 105 encrypts communication data, in accordance with conventional encryption techniques, using the session key bits extracted from key container 135 [step 1125]. Communication device 105 then may use the encrypted communication data to communicate with other communication devices, such as communication device 110 [step 1130]. Communication device 105 may discard the session key bits used for encrypting the communication data when the communication session with the other communication devices completes [step 1135].

CONCLUSION

Systems and methods consistent with the present invention, therefore, provide plug-in key storage modules that can supply encryption key bits to communications devices. Each plug-in key storage module stores a limited supply of encryption session keys that can be used for encrypting communications in the communications devices. Each plug-in can be re-supplied with encryption keys from a key supply device when the limited supply is exhausted.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, key containers may additionally be used with non-communication devices such as digital cameras, digital audio recorders, or the like. Session keys from a first key container can be used to encrypt digital data stored in the non-communication device, such as digital picture data or digital audio data. The encrypted data can then be stored in an internal memory of the non-communication device. Session keys from a second key container could then be used to decrypt the stored data. In this manner, data stored in a non-communication device such as a digital camera could be kept private even if the device were lost or stolen.

Additionally, while certain components of the invention have been described above as implemented in hardware and others in software, other configurations may be possible. Also, while series of steps have been described with regard to FIGS. 7–11, the order of the steps is not critical. Further, no element, step, or instruction used in the description of the present application should be construed as critical or essential to the invention unless explicitly described as such. The scope of the invention is defined by the following claims and their equivalents.

What is claimed is:

1. A method of encrypting information, comprising:
generating a first collection and a second collection of encryption bits in a key supply device;
supplying said first collection of encryption bits to a key storage module;
storing said first collection of encryption bits in a memory of said key storage module;
transporting said key storage module to a data production device;
connecting said key storage module to said data production device;
supplying said first collection of encryption bits from said module to said data production device;
deleting said first collection of encryption bits from said memory of said key storage module; and
encrypting data produced by said data production device using said first collection of encryption bits.

2. The method of claim 1, further comprising:
transporting said key storage module to said key supply device;
connecting said key storage module to said key supply device;
supplying said second collection of encryption bits from said key supply device to said key storage module; and
storing said second collection of encryption bits in the memory of the key storage module.

3. The method of claim 2, further comprising:
supplying power from said key supply device to said key storage module after said key storage module is connected with said key supply device.

4. The method of claim 1, further comprising:
supplying power from said data production device to said key storage module after said key storage module is connected with said data production device.

5. The method of claim 1, further comprising:
storing said encrypted data in a memory of said data production device.

6. The method of claim 1, wherein said data production device comprises a communication device.

7. The method of claim 6, further comprising:
transmitting said encrypted data from said communication device to another communication device.

8. A method of encrypting information, comprising:
receiving a fixed quantity of encryption bits within a key storage module;
retrieving a quantity of encryption bits from a memory of the key storage module connected to a port of a communication device, wherein said retrieval depletes a total amount of encryption bits stored in the key storage module;
determining whether said retrieval depletes said stored encryption bits below a predetermined amount; and
encrypting data transmitted from said communication device using said quantity of encryption bits.

9. The method of claim 8, further comprising:
signaling an encryption bit insufficiency condition when said retrieval depletes said stored encryption bits below said predetermined amount.

10. The method of claim 8, further comprising:
receiving a second quantity of encryption bits from a key supply device based on said determination.

11. A system for encrypting information, comprising:
a key storage module configured to:
store a fixed quantity of encryption bits in a memory of said key storage module; and
a communication device configured to:
retrieve a quantity of encryption bits from said memory of said key storage module, wherein said retrieval depletes from the fixed quantity of encryption bits stored in the key storage module, and
encrypt data transmitted from said communication device using said quantity of encryption bits;
wherein said key storage module is further configured to:
determine whether said retrieval depletes said stored encryption bits below a specified amount.

12. The system of claim 11, wherein said key storage module is further configured to:
signal an encryption bit insufficiency condition when said retrieval depletes said stored encryption bits below said specified amount.

13. The system of claim 11, wherein said key storage module is further configured to:
receive a second quantity of encryption bits from a key supply device based on said determination.

14. A computer-readable medium containing instructions for controlling at least one processor to perform a method of encrypting information at a communication device, the method comprising:
retrieving a quantity of encryption bits from a memory of a key storage module connected to a port of said communication device, wherein said retrieval depletes a total amount of encryption bits stored in the key storage module,
determining whether said retrieval depletes said stored encryption bits below a predetermined amount, and
encrypting data transmitted from said communication device using said quantity of encryption bits.

15. A method of encrypting information, comprising:
generating a first collection and a second collection of encryption bits in a key supply device;
supplying said first collection of encryption bits to a key storage module;
storing said first collection of encryption bits in a memory of said key storage module;
transporting said key storage module to a data production device;
connecting said key storage module to said data production device;
supplying said first collection of encryption bits from said module to said data production device;
deleting said first collection of encryption bits from said memory of said key storage module;
encrypting data produced by said data production device using said first collection of encryption bits;
transporting said key storage module to said key supply device;
connecting said key storage module to said key supply device;
supplying said second collection of encryption bits from said key supply device to said key storage module;
storing said second collection of encryption bits in the memory of the key storage module;
transporting said key storage module to the data production device;
connecting said key storage module to the data production device;
supplying the second collection of encryption bits from said module to said data production device;
deleting said second collection of encryption bits from the memory of said key storage module; and
encrypting data produced by said data production device using said second collection of encryption bits.

16. A method of encrypting information, comprising:
retrieving a quantity of encryption bits from a memory of a key storage module connected to a port of a communication device, wherein said retrieval depletes a total amount of encryption bits stored in the key storage module;
encrypting data transmitted from said communication device using said quantity of encryption bits;
determining whether said retrieval depletes said stored encryption bits below a predetermined amount;
receiving a second quantity of encryption bits from a key supply device based on said determination; and
storing said second quantity of encryption bits in said memory of said key storage module, wherein said second quantity of encryption bits replenishes a total amount of encryption bits stored in said key storage module.

17. A system for encrypting information, comprising:
a key storage module configured to:
    store encryption bits in a memory of said key storage module; and
a communication device configured to:
    retrieve a quantity of encryption bits from said memory of said key storage module, wherein said retrieval depletes a total amount of encryption bits stored in the key storage module, and
    encrypt data transmitted from said communication device using said quantity of encryption bits;
wherein said key storage module is further configured to:
    determine whether said retrieval depletes said stored encryption bits below a specified amount,
    receive a second quantity of encryption bits from a key supply device based on said determination, and
    store said second quantity of encryption bits in said memory, wherein said second quantity of encryption bits replenishes a total amount of encryption bits stored in said key storage module.

* * * * *